Figure 1:
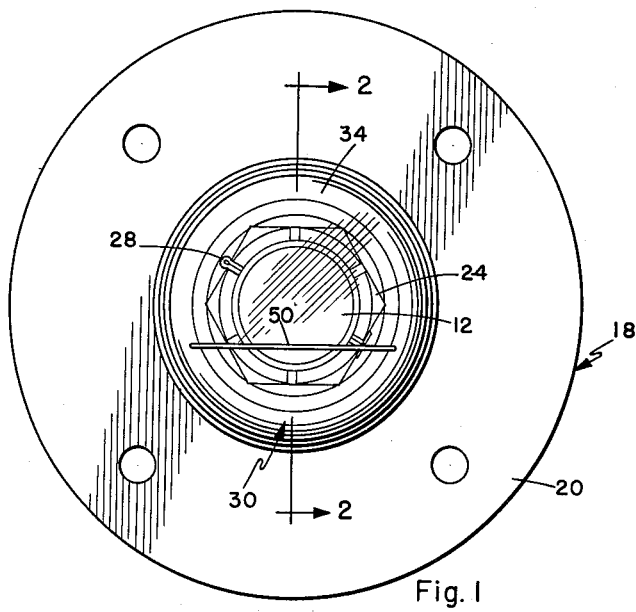

May 14, 1963     C. L. STEINER     3,089,738

BOAT TRAILER HUB WITH OIL BATH AND WATER SEAL

Filed July 10, 1961

INVENTOR.
CHARLES L. STEINER
BY Knox & Knox 3,089,738
BOAT TRAILER HUB WITH OIL BATH
AND WATER SEAL
Charles L. Steiner, 4774 70th St., La Mesa, Calif.
Filed July 10, 1961, Ser. No. 122,889
1 Claim. (Cl. 308—187)

This invention relates to a wheel mounting assembly and more particularly to such an assembly for a boat trailer.

Background

It is well known that for financial reasons, many boat owners do not have permanent or rented moorings for their boats. These people prefer to keep their boats at home, and to tow them to and from the boating areas.

This means that the boats are mounted onto a boat trailer that is towed by an automobile. The acceptable method of launching the boat is to back up the automobile and trailer until the trailer rolls far enough into the water so that the boat floats free. When the boat is to be taken out of the water, the procedure is reversed.

It will be understood that in following the above procedure the wheel bearings of the trailer are repeatedly immersed. This has an extremely deleterious effect. Firstly, water enters the bearings, and causes rusting and corrosion. Secondly, sand and other water-carried materials enter the bearings and their abrasive action shortens the life of the bearings, frequently causing overheating and failure.

I have found that the above unsatisfactory situation is particularly prevalent with grease-type bearings. As is well known, a relatively heavy-bodied, non-flowing grease is used. Under the influence of centrifugal force, pressure, and wear, many of the bearing surfaces have the grease removed therefrom. And, since the grease does not flow back to these surfaces, until they are heated by friction, they remain unprotected to a great extent. This is the main reason why the wheels must be repacked with grease at frequent intervals.

These unprotected areas are particularly susceptible to rusting and abrasion produced when the wheel bearings are immersed in the water.

Objects and Drawings

It is therefore the principal object of my invention to provide an improved wheel mounting arrangement.

It is another object of my invention to provide an improved wheel mounting that uses oil rather than grease.

It is a further object of my invention to provide an improved wheel mounting that uses oil contained in a sealed oil reservoir.

It is a further object of my invention to provide an improved wheel mounting that uses oil contained in a sealed oil reservoir having an oil-level-inspection window.

It is a still further object of my invention to provide an improved wheel mounting that uses oil contained in an oil reservoir having an oil-level-inspection window, and an additional seal that keeps water and water-suspended particles out of the wheel bearings.

Figure 2:
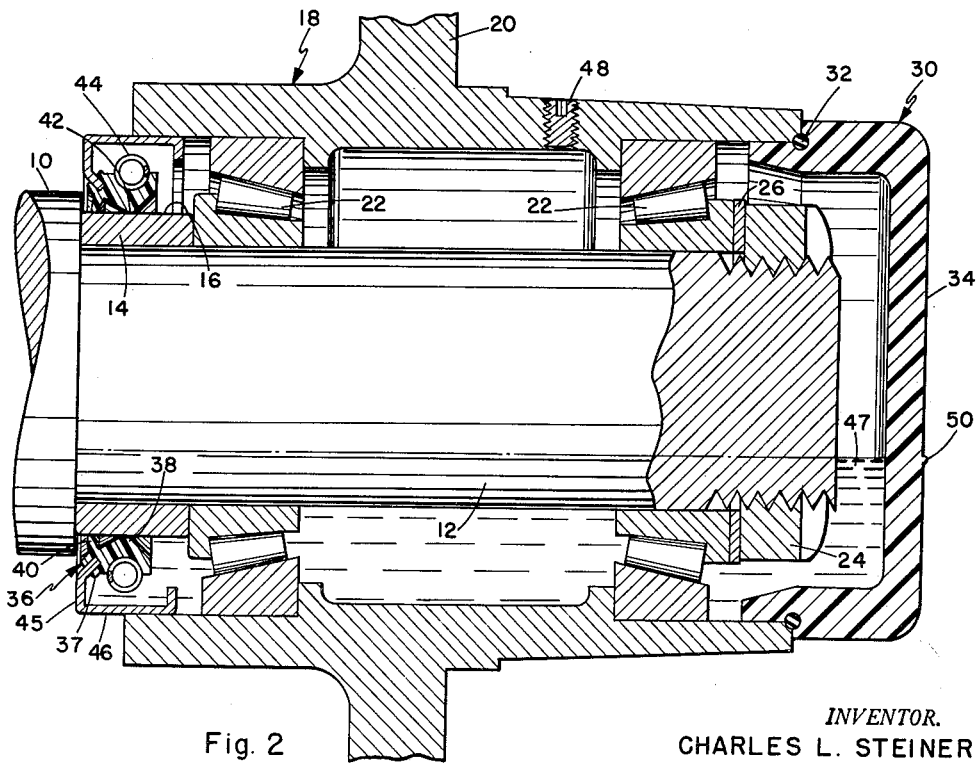

The attainment of these objects and others will be realized from the following specification, taken in conjunction with the drawings, of which:

FIGURE 1 is an end view of my invention, showing the oil-level inspection window; and FIGURE 2 is an enlarged sectional view taken on the line 2—2 of FIGURE 1.

Description of the Invention

As may be seen, a dead axle 10 has a portion 12 of reduced diameter. The inner end of portion 12, that is, the part closest to the trailer body, has a collar 14 encircling it. Collar 14 does not rotate, and is securely fastened to axle portion 12. The fastening may be a force-fit, and have a sealant positioned between the inner surface of collar 14 and the outer surface of axle portion 12 to make the seal leak-proof, for reasons that will become apparent from subsequent portions of this explanation. The outer surface 16 of collar 14 is preferably extremely smooth, wear resistant, and rust proof. For these reasons, I prefer to make collar 14 of polished stainless steel or the equivalent.

A hub 18 contains a wheel disc 20 to which the wheel proper is fastened by means of threaded bolts. Wheel mounting assembly contains friction reducing bearings 22, which may be of the ball, roller, or tapered roller type.

A nut 24, washer 26, and cotter pin 28 hold the hub on the axle.

A dust cap or hub cap 30 is affixed in a leak-proof manner to the hub 18. This may involve use of a sealant, or an O ring 32 to assure leak-proofing. Hub cap 30 is either completely transparent or has a transparent face panel 34, which will be referred to hereinafter.

At the inner end of hub 18, I provide an annular seal 36 having an angularly disposed channeled annular boss 37, an oil-sealing lip 38, a water-sealing lip 40, and an annular seat 42. A metal seal retaining ring 45 has an angularly inwardly extending annular edge portion received in tightly sealed relation in the channel of said channeled boss 37 to coact with the spring 44 in holding the seal 36 in position, and the outer portion 46 of the retaining ring 45 is cylindrical and press fitted into the inner end of the hub 18. A helical coil spring 44 is positioned on the pressure surface 42, and causes the lips 38 and 40 to press tightly against the smooth outer surface 16 of collar 14.

I overcome the disadvantages of a grease-type bearing by using oil 46. This oil bath type of lubrication is not affected by centrifugal force, pressure, or wear, since as the wheel rotates, the oil immediately flows into and lubricates all the surfaces. Moreover, the oil lubricates immediately, and does not require frictional heat to cause it to flow to the cleared areas.

Of course, the oil must be prevented from leaking out, and my disclosed structure accomplishes the desired result. As may be seen, hub cap 30 seals one end of the reservoir, and oil-sealing lip 38 forms the other end of the oil reservoir. Within these ends, the bearings are rotating in a continuous bath of liquid oil and splashed oil vapors.

The two-lipped annular seal 36 has a second function; namely water-sealing lip 40 prevents water, sand and other water-carried particles from entering the bearings.

When oil is poured or added, to the oil reservoir through filler hole 48, the level must be known. An indicator line 50 on the transparent face panel 34 of the hub cap advises when the proper level is reached. Furthermore, oil-level line 50 also permits easy checking of the oil level during use, and the user is advised when replenishment is required. The indicator line 50 may be a linear depression, a linear bead or other marking on the face panel 34.

As wheel mounting assembly 18 rotates, it rotates on bearings 22. Simultaneously, annular seal 36 rotates about collar 16. The two lips of the seal move in a sliding leak-proof manner along the smooth outer surface of collar 14.

I have found that several materials, such as nylon, teflon, and the like, serve very satisfactorily as seal material. These, and others, have the designed resiliency, strength, smoothness, low coefficient of friction, heat resisting ability, durability, and other properties.

Advantages

It will be realized that my improved trailer wheel mounting has a number of important advantages. Firstly, it uses oil lubrication, which offers less friction, provides more complete lubrication, and operates immediately without requiring frictional heat to cause it to flow. Secondly, no wheel packing is necessary. Thirdly, the oil is kept within the reservoir area, and a seal prevents leakage. Fourthly, the same seal prevents the ingress of sand or other abrasive material, thus protecting the bearings, and providing a long bearing life. Fifthly, the spring-loaded two-lipped seal contacts an extremely smooth rust-free long wearing collar, thus avoiding leakage, and the transparent dust cap or hub cap 30, with its indicator line 50 enables the user to check the oil level rather more frequently than is feasible in grease-lubricated hubs, thereby ensuring against failure of the bearings by reason of heretofore all too frequent inadequate lubrication in prior art hub construction.

The hereindisclosed wheel mounting permits the trailer wheels to be immersed without danger when the boat on the trailer is being launched or withdrawn from the water, without endangering the proper lubrication of the bearings for high speed operation of the trailer on the highway.

It is understood that minor variation from the form of the invention disclosed herein may be made without departure from the spirit and scope of the invention, and that the specification and drawing are to be considered as merely illustrative rather than limiting.

I claim:

A permanently sealed un-vented wheel mounting assembly comprising:

a fixed axle;

a stainless steel sleeve collar having a smooth polished surface of fixed diameter positioned to encircle said axle and affixed thereto and spaced from an end of said axle;

a wheel hub, having bearings, mounted for rotation on said axle;

means, comprising a two-lipped annular seal positioned to encircle said collar with said lips in contact with said smooth outer surface, for providing a frictional seal between said hub and said collar; helical coil spring means, positioned to encircle said annular seal, for producing uniform constant contact between said lips and said smooth outer surface of said collar;

an means to seal said sub adjacent said end of said axle; said hub having a filler hole and closure therefor, whereby fluid lubricating oil may be inserted in said hub; said means including a transparent cup-shaped hub cap sealed to said hub and having its transparent face portion adjacent the end of said axle, whereby the level of said oil can be visually inspected; said transparent face portion portion of said hub cap having an oil level indicator line thereon.

References Cited in the file of this patent

UNITED STATES PATENTS

| | | |
|---|---|---|
| 2,058,143 | Flanders | Oct. 20, 1936 |
| 2,622,934 | Phelps | Dec. 23, 1952 |
| 2,657,104 | Kayser | Oct. 27, 1953 |
| 2,851,315 | Zavoda | Sept. 9, 1958 |
| 2,854,287 | Stephens | Sept. 30, 1958 |
| 2,914,364 | Ross | Nov. 24, 1959 |
| 3,000,675 | Larkin | Sept. 19, 1961 |
| 3,010,748 | Haynie | Nov. 28, 1961 |